United States Patent [19]

Blake et al.

[11] 3,913,303

[45] Oct. 21, 1975

[54] FEED ROLL CONSTRUCTION FOR FORAGE HARVESTER

[75] Inventors: Nathan L. Blake, Coldwater; Gerald F. Richards, Celina, both of Ohio

[73] Assignee: Avco Corporation, Coldwater, Ohio

[22] Filed: Mar. 4, 1974

[21] Appl. No.: 447,919

[52] U.S. Cl. .................. 56/14.1; 56/1; 56/14.6; 56/DIG. 1
[51] Int. Cl.² ......................................... A01D 45/02
[58] Field of Search .............. 56/DIG. 1, 13.3, 14.1, 56/14.2, 14.3, 14.4, 14.6, 13.9, 1

[56] References Cited
UNITED STATES PATENTS

| | | | |
|---|---|---|---|
| 3,282,404 | 11/1966 | Corwith et al. | 56/DIG. 1 |
| 3,444,673 | 5/1969 | Evans | 56/DIG. 1 |
| 3,722,190 | 3/1973 | Fisher | 56/DIG. 1 |
| 3,739,559 | 6/1973 | Long et al. | 56/13.9 |

Primary Examiner—Louis G. Mancene
Assistant Examiner—James D. Hamilton
Attorney, Agent, or Firm—Charles M. Hogan

[57] ABSTRACT

A forage harvester feed roll assembly comprising a pair of opposed elongated support frames and a plurality of feed rolls journaled between them. The aft ends of the support frames are guided for vertical movement only. A first torsion bar is mounted above the support frames and has a pair of fixed radius arms connected to the support frames to resist relative twisting movement. A second torsion bar is rigidly connected between the support frames at a point spaced from the links to further enhance the capability of the support frames in resisting twisting loads. The support frames are cast and have integral bosses receiving bearings for the feed rolls to minimize wear. A chain drive interconnecting the feed rolls has a simplified tensioning arrangement.

2 Claims, 4 Drawing Figures

FEED ROLL CONSTRUCTION FOR FORAGE HARVESTER

The present invention relates to forage harvesters and more particularly to a feed roll construction for this type of harvester.

An essential piece of equipment for the practice of ensilage is a forage harvester which cuts crops into small particles after they have been harvested by a field-going gathering unit. The typical forage harvester includes a rotary cutter having helical blades which cooperate with a fixed cutter bar to cut material passing across the fixed cutter bar. An additional perforated recutter screen may be used to further reduce the size before the material is transferred to an aft discharge by a transfer auger. A significant advance in the design of this aspect of forage harvesters may be found in the co-pending application Ser. No. 440,155, filed Feb. 5, 1974, entitled "Forage Harvester with Improved Flow Pattern for Cut Material", G. F. Richards and N. L. Blake inventors, of common assignment with the present invention.

In this general type of forage harvester a feed roll mechanism takes the harvested crops and feeds them past the cutter head. The feed roll construction typically consists of elongated side frames having two or more cylinders extending between them. The cylinders have teeth so that when they are driven they forcibly feed material into the cutter. The feed roll mechanism should be flexible to accommodate varying quantities of material as the unit traverses the field. It must at all times, however, press the material toward a cooperating fixed roll or conveyor to properly feed the material into the cutter. One of the particularly aggravating problems encountered with this type of device is that material will not always pass through the feed roll mechanism uniformly between the ends of the feed rolls. When material bunches up at one end of the rolls it causes a twisting moment between the opposed support frames. Present designs do an acceptable job of resisting these loads but are not as successful when rather substantial twisting loads are encountered. The resultant twisting leads to premature wear of the bearings journaling the elements and generally requires frequent maintenance.

The above problems are solved by a forage harvester feed roll assembly which comprises a pair of opposed elongated support frames having a plurality of feed rolls journaled between them. The support frames are guided for movement normal to their axis at a point in line with one of the rolls. A first torsion bar has radius arms connected to its ends which in turn are connected to the support frames to resist twisting movement. A second torsion bar extends between the support frames at a point spaced from the point of connection of the links to further resist twisting movement.

The above and other related features of the present invention will be apparent from a reading of the following description of the disclosure shown in the accompanying drawings and the novelty thereof pointed out in the appended claims.

Figure 1:
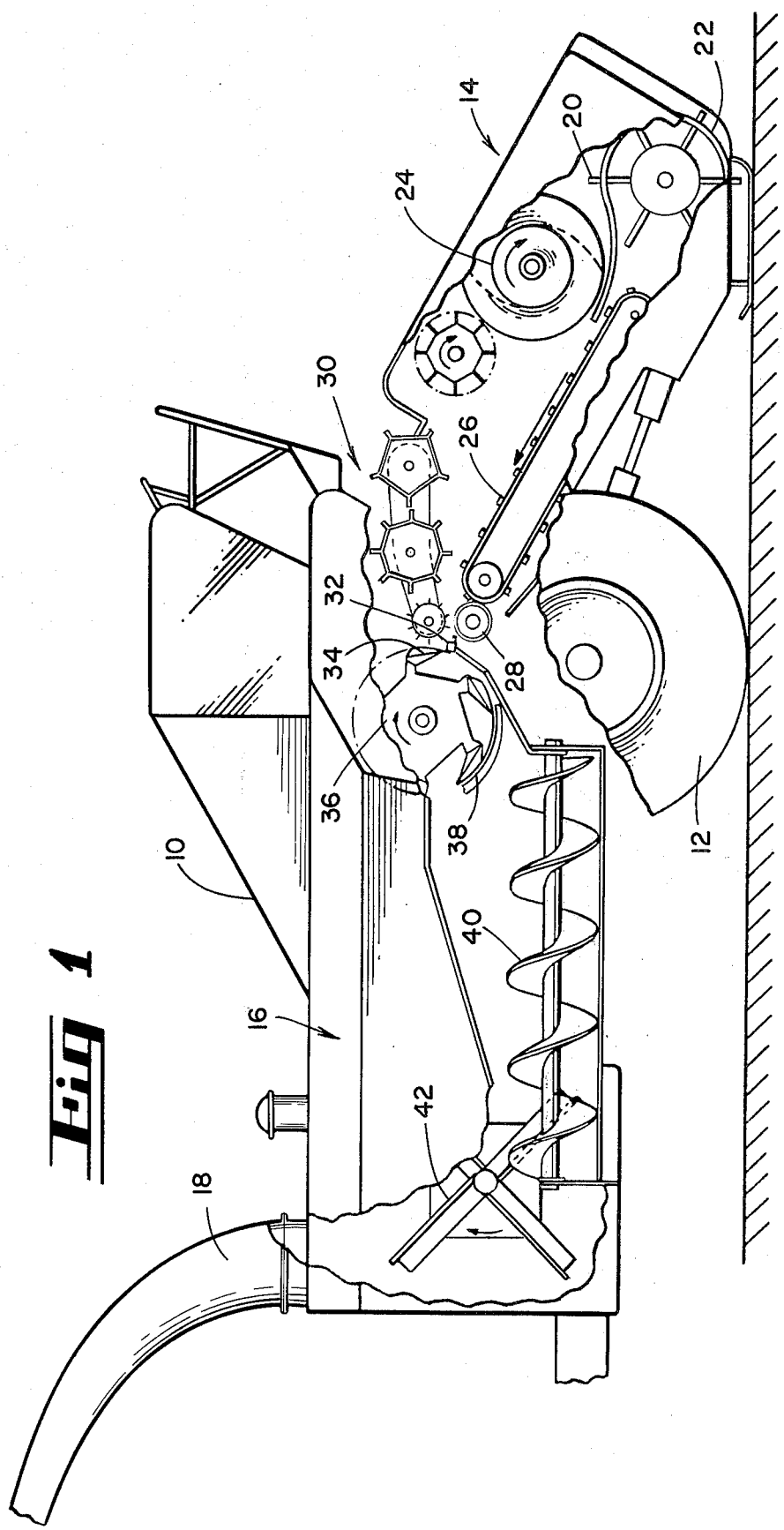
FIG. 1 shows a simplified side view of a forage harvester employing a feed roll construction embodying the present invention, along with a self-propelled power unit and a pick-up mechanism with which it may be used.

Referring to FIG. 1 there is shown a self-propelled power unit 10 having ground-engaging wheels 12 for driving the unit across a field. A pick-up mechanism, generally indicated at 14, extends from the power unit 10 to pick up field crops and pass them to a forage harvester 16 where the crops are cut into small particles and discharged from a curved blower spout 18 to a suitable storage wagon or truck.

The pick-up attachment 14 is particularly used for hay and similar materials. It should be apparent, however, that other types of pick-up units may be used for other types of crops. The pick-Up attachment 14 consists of rotating teeth 20 received in a slotted forward shield 22 for picking up hay and sweeping it over its top. An auger assembly 24 pushes the severed hay toward the center of the pick-up unit where the hay is elevated and transferred toward the forage harvester 16 by a driven conveyor 26. A fixed driven feed roll 28 is positioned adjacent the upper end of the conveyor 26 and cooperates with a feed roll assembly, generally indicated at 30, to forcibly feed material across a fixed lateral cutter bar 32. Helical blades 34 on a rotary cutter 36 cut the material into small particles. A perforated recutter screen 38 may be used to reduce the size further for discharge into a fore and aft transfer auger 40. Auger 40 carries the material to rotating paddles 42 which sweep the material up and through discharge spout 18.

Figure 2:
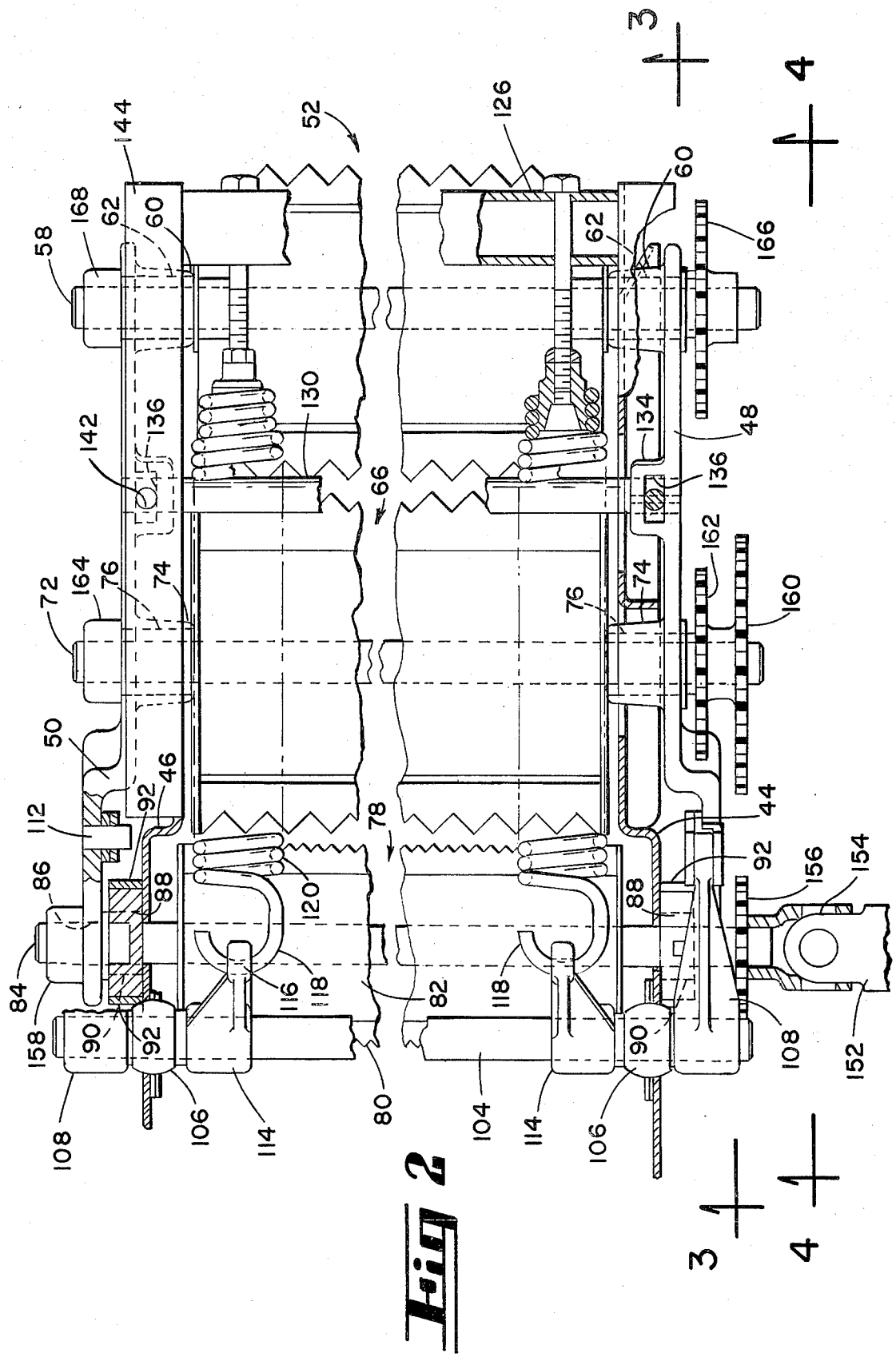
FIG. 2 is an enlarged plan view of the feed roll construction of FIG. 1.
Figure 3:
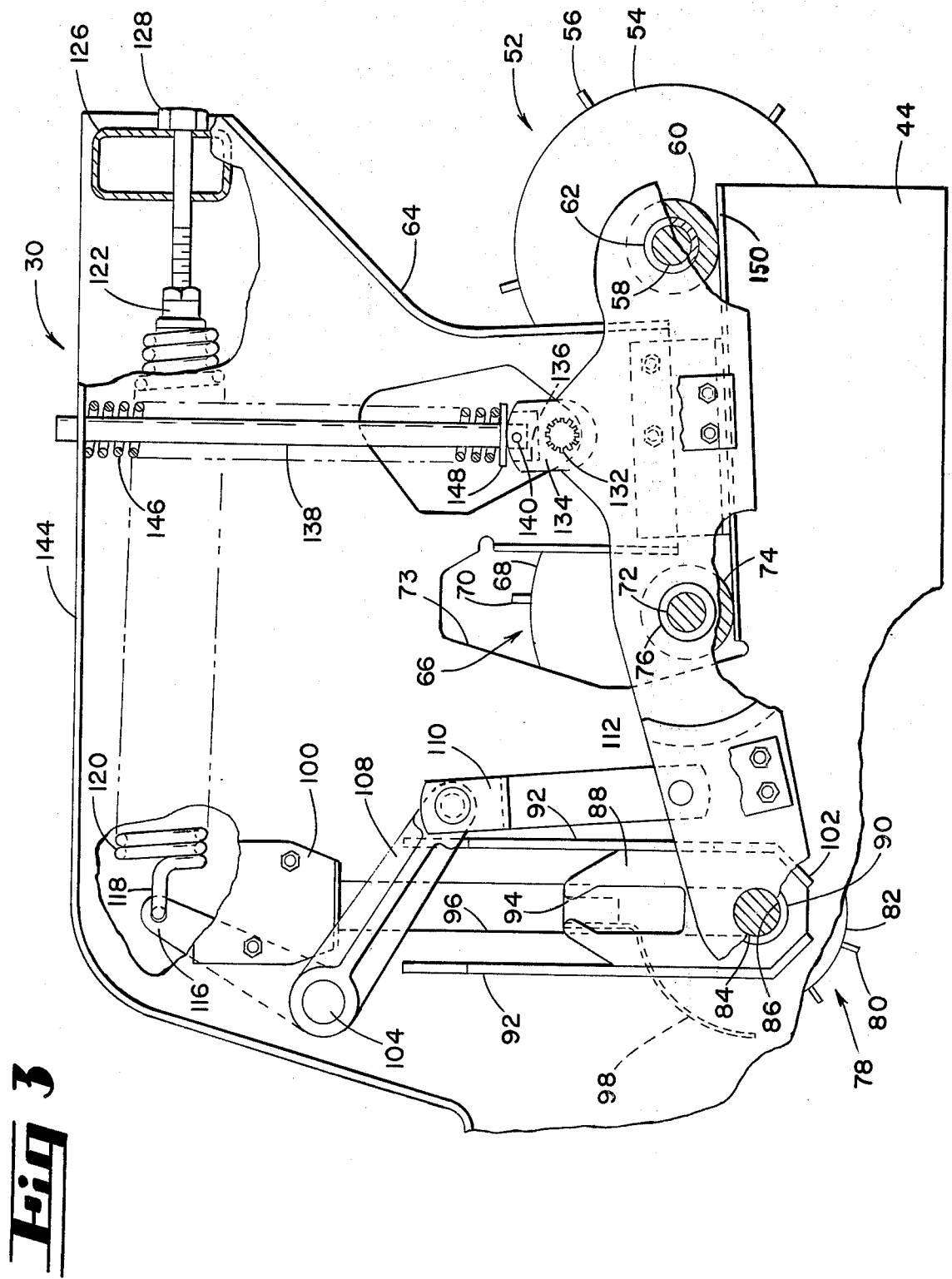
FIG. 3 is a side view of the feed roll construction of FIG. 2, taken on line 3–3 of FIG. 2.
Figure 4:
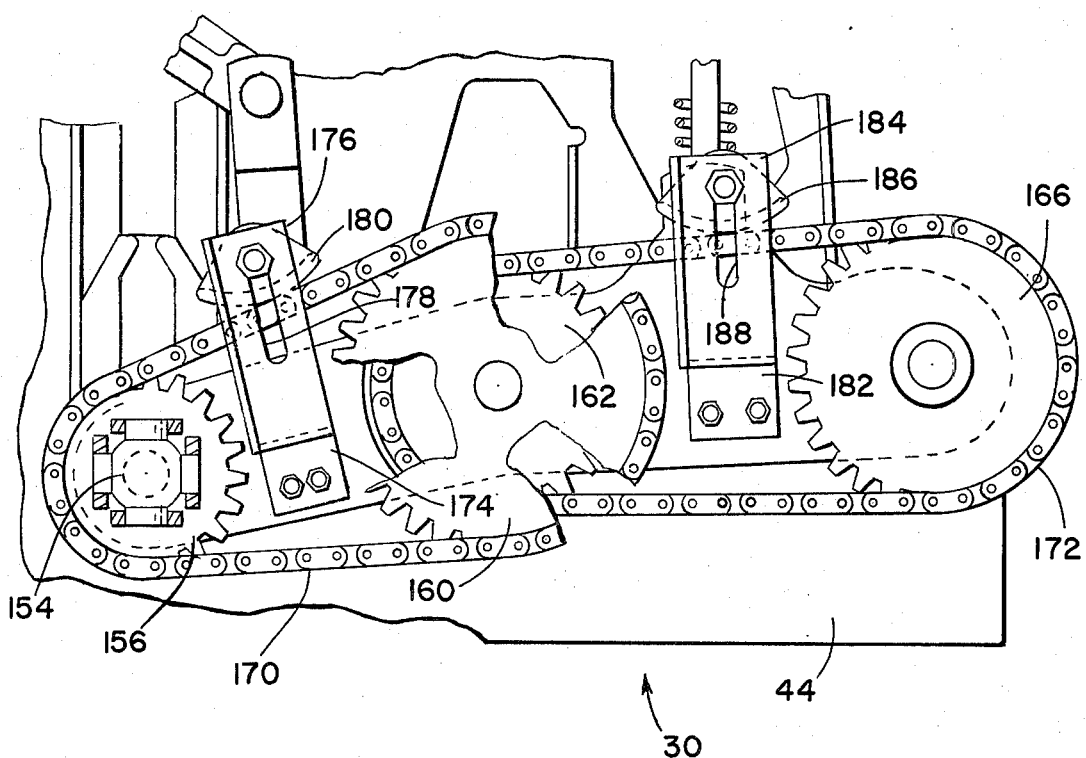
FIG. 4 is a fragmentary view of the feed roll construction of FIG. 2, taken on line 4–4 of FIG. 2.

As shown particularly in FIGS. 2, 3 and 4, the feed roll assembly 30 comprises a spaced pair of opposed fixed main side frames 44 and 46 which are suitably mounted in the forage harvester 16. A spaced pair of opposed elongated support frames 48 and 50 are positioned adjacent the outer facing sides of the fixed frames 44 and 46, respectively.

A forward feed roll 52 comprising a cylinder 54 and teeth 56 is supported on a shaft 58 extending normal to and in between support frames 48 and 50. Bosses 60, preferably integral with support frames 48 and 50, mount sleeve bearings 62 which journal the ends of the shaft 58 in the support frames. As shown in FIG. 3, there are recesses 64 in the forward edges of fixed frames 44 and 46 permitting vertical 4ovement of the forward feed roll 52.

An intermediate feed roll 66 comprises a cylinder 68 having teeth 70 and mounted on a shaft 72 extending between support frames 48 and 50. Bosses 74, preferably integral with frames 48 and 50, support sleeve bearings 76 which journal the ends of shaft 72 in support frames 48 and 50. Slots 73 in frames 44 and 46 permit vertical movement of feed roll 66.

An aft or rear feed roll 78 comprises teeth 80 extending from a cylinder 82 mounted on a shaft 84 extending between support frames 48 and 50. The ends of shaft 84 extend through holes 86 in support frames 48 and 50. Shaft 84 also extends through slider elements 88 positioned inboard from frames 48 and 50 and adjacent the fixed frames 44 and 46. Slider elements 88 receive sleeve bearings 90 that journal shaft 84. Slider elements 88 are guided for vertical movement only by opposed flanges 92 forming vertical channels or races on the fixed frames 44 and 46. Slider elements 88 each have tabs 94 extending through vertical slots 96 in the fixed frames 44 and 46. A sheetlike shield 98 is curved to follow the upper contour of feed roll 78 and is secured at its ends to the tabs 94. Flange plates 100 secured to the fixed frames 44 and 46 adjacent the top edge of slot 96 limit the vertical movement of slider element 88 and bent end portions 102 of the flange elements 92 provide a bottom stop.

A first torsion bar 104 extends between fixed frames 44 and 46 in a direction parallel to the axes of the feed rolls 52, 66 and 78. Torsion bar 104 is journaled in the frames 44 and 46, at points above support frames 48, 50, by bearing assemblies 106. Torsion bar 104 has a first set of linkages including radius arms 108 secured to its ends. Radius arms 108 have links 110 pivotally connected to their free end. Links 110 are pivotally connected to support frames 48 and 50 through pins 112, each positioned at a point spaced from the axis of shaft 84. Torsion bar 104 has second linkages consisting of radius arms 114 secured to the torsion bar 104 inboard of fixed frames 44 and 46. Radius arms 114 extend upward and have holes 116 which receive hooks 118 at one end of a pair of springs 120. The opposite ends of springs 120 are secured to elements 122 as threaded onto bolt assemblies 124. Bolt assemblies 124 are received in a cross frame 126 secured between fixed frames 44 and 46. Manipulation of heads 128 on bolts 124 axially displaces the threaded element 122 and hence the free length of first spring means 120. This in turn varies their tension.

A second torsion bar 130 extends between the support frames 48 and 50 at a point spaced from the pins 112 and preferably above and between shafts 72 and 58 of the front and intermediate feed rolls. Torsion bar 130 has splined ends 132 received in sockets 134 preferably integral with frames 48 and 50 to transmit torsional movement between these frames. Sockets 134 have upper facing recesses 136 which receive guide shafts 138 pivotally connected by pins 140. The upper ends of shafts 138 are guided for movement of openings 142 in upper flanges 144 on frames 44 and 46. Springs 146 comprising second spring means are telescoped over shafts 138 and have their upper end acting against the lower sides of flanges 144 and their lower ends acting on washers 148 which rest on the sockets 134. Thus, we see that the front sectors of the support frames 48 and 50 are independently yieldably urged by second spring means 146 in a downward direction in line with the axis of the second torsion bar 130. A flange or stop formation 150 on each of the fixed frames 44 and 46 limits downward travel of feed rolls 52 and 66 when the bosses 60 and 74 rest on it.

The feed rolls 78, 66 and 52 are driven in synchronism by the drive system described below with particular reference to FIGS. 2 and 4. An input drive shaft 152 is connected to a suitable power source on the power unit 10 and is connected to the shaft 84 through a universal joint 154. A sprocket 156 is positioned at one end of the shaft 84 and a collar 158 at the other end. A sprocket assembly consisting of a first sprocket 160 in line with sprocket 156 and a second sprocket 162 is positioned at one end of shaft 72 and a retaining collar 164 positioned at the opposite end. A sprocket 166 is positioned at one end of shaft 58 in line with sprocket 162 and a retaining collar 168 positioned at its opposite end.

The sprockets on the ends of the shafts for the feed rolls have selected numbers of teeth so that feed roll 78 rotates at the highest rate, feed roll 66 at an intermediate rate and feed roll 52 at the lowest rate to insure proper feeding of material through the assembly. Sprockets 156 and 160 are interconnected by an endless chain 170.

A first chain tensioner comprises a Z-shaped platelike element 174 secured to support frames 48 and 50 and having an outer section 176 positioned outboard of chain 170 and extending beyond it. A slot 178 in section 176 receives a shoe 180 adjustably secured in the slot 178 to press chain 170 inward and vary its tension. A second Z-shaped chain tensioner 182 is secured to the support frames 48 and 50 in between sprockets 162 and 166. This tensioner has a section 184 outboard of chain 172 ]nd extending beyond it. A shoe 186 is received in a slot 188 formed in section 184. Shoe 186 is adjustably secured along the slot 188 to vary the degree to which it presses the chain 172 inward and thus its tension.

During operation of the forage harvester described above the feed rolls 52, 66 and 78 are rotated to feed material toward the fixed cutter bar 32 in cooperation with the conveyor 26 and fixed lower feed roll 28. As varying amounts of material pass across the rolls there is a tendency for the support frames 48 and 50 to twist relative to one another. However, this tendency to twist is substantially resisted by the first and second torsion bars 104 and 130. Torsion bar 130 resists the twisting directly while torsion bar 104 resists the torsion caused by the twisting through the use of the links 110. The reason for providing the links at this end is that the rear feed roll 78 is permitted to move in the vertical plane defined by the flanges or races 92. FUrther resistance to twisting of the support frames 48 and 50 is provided by the shield 98 although the primary resistance is provided by the torsion bars 104 and 130.

Torsion bar 104, in addition to resisting twisting movements, provides the mechanism through which the rear sectors of the support frames and the aft ends of the feed rolls are urged downward, namely, through the use of radius arms 114 connected to springs 120. Springs 120 are readily adjusted to vary the force with which each end of the aft feed roll is urged downward for optimum feeding conditions. The sockets 134 receiving the second torsion bar 130 also provide a convenient point with which to mount the second set of springs 146. By placing the line of action of these springs 146 along the axis of torsion bar 130 the possibility of secondary torsional moments about bar 130 is minimized if not eliminated.

The tension of the drive chains for the feed rolls is adjusted by the shoes 180 and 186 that are in a position for convenient adjustment.

While the preferred embodiment of the present invention has been described, it should be apparent that it may be practiced in other forms without departing from its spirit and scope.

Having thus described the invention, what is claimed as novel and desired to be secured by Letters Patent of the United States is:

1. A forage harvester feed roll assembly comprising, in combination:
    a spaced pair of fixed main frames,
    a spaced pair of support frames individually located outboard of said main frames, front, intermediate and rear feed rolls respectively having front, intermediate and rear shafts journaled in said support frames, said main frames having stop formations to define lower-limit positions for said front and intermediate feed rolls, a first torsion bar journaled in the main frames at points above the support frames, a second torsion bar bridging and rigidly secured between the support frames at points above and between said front and intermediate feed rolls, and duplicate means, one on each side, for urging the ends of the feed rolls toward the lower-limit positions while permitting independent upward displacement of the ends of the rolls with resultant restoring forces exerted by said torsion bars, each of said duplicate means comprising:
- a first linkage between the rear of said associated support frame and one end of said first torsion bar, so arranged that relative upward movement of said rear turns said end,
- a second linkage comprising an arm on and rigid with said end of said first torsion bar,
- a first spring means between the associated main frame and said arm for transmitting spring force through said first linkage to urge the rear of said associated support frame downwardly,
- a second spring means between the associated main frame and a surface of the associated support frame located between front and intermediate feed rolls for urging the front of said associated support frame downwardly, and
- slide-and-race means formed to confine limited displacements of said rear of said associated support frame to the vertical.

2. A forage harvester feed roll assembly comprising:

a pair of fixed main frames, a pair of support frames, front, intermediate and rear feed rolls journaled on and extending between said support frames, means for guiding the rears of the support frames and the rear feed roller for limited vertical displacement, a first torsion bar journaled in said main frames and positioned generally parallel to and above the rear feed rolls, dual linkages connecting the rears of said support frames to the ends of said torsion bar so that upward movement of one end of a rear feed roll turns the associated end of said torsion bar, dual spring means independently operating through said linkages to urge the rear ends of said support frames downwardly, a second torsion bar positioned parallel to the axis of said feed rolls and rigidly connected between said support frames at a point above and between the front and intermediate feed rolls, and second dual spring means independently urging the fronts of said support frames downwardly, said main frames being formed to limit downward displacement of the front and intermediate feed rolls.

* * * * *